Oct. 22, 1929.   G. A. SCHETTLER   1,732,341
MEASURING MACHINE
Filed Sept. 7, 1926   2 Sheets-Sheet 1

INVENTOR
Gustav A. Schettler
By his Attorney
Nelson W. Howard

Oct. 22, 1929.   G. A. SCHETTLER   1,732,341
MEASURING MACHINE
Filed Sept. 7, 1926   2 Sheets-Sheet 2
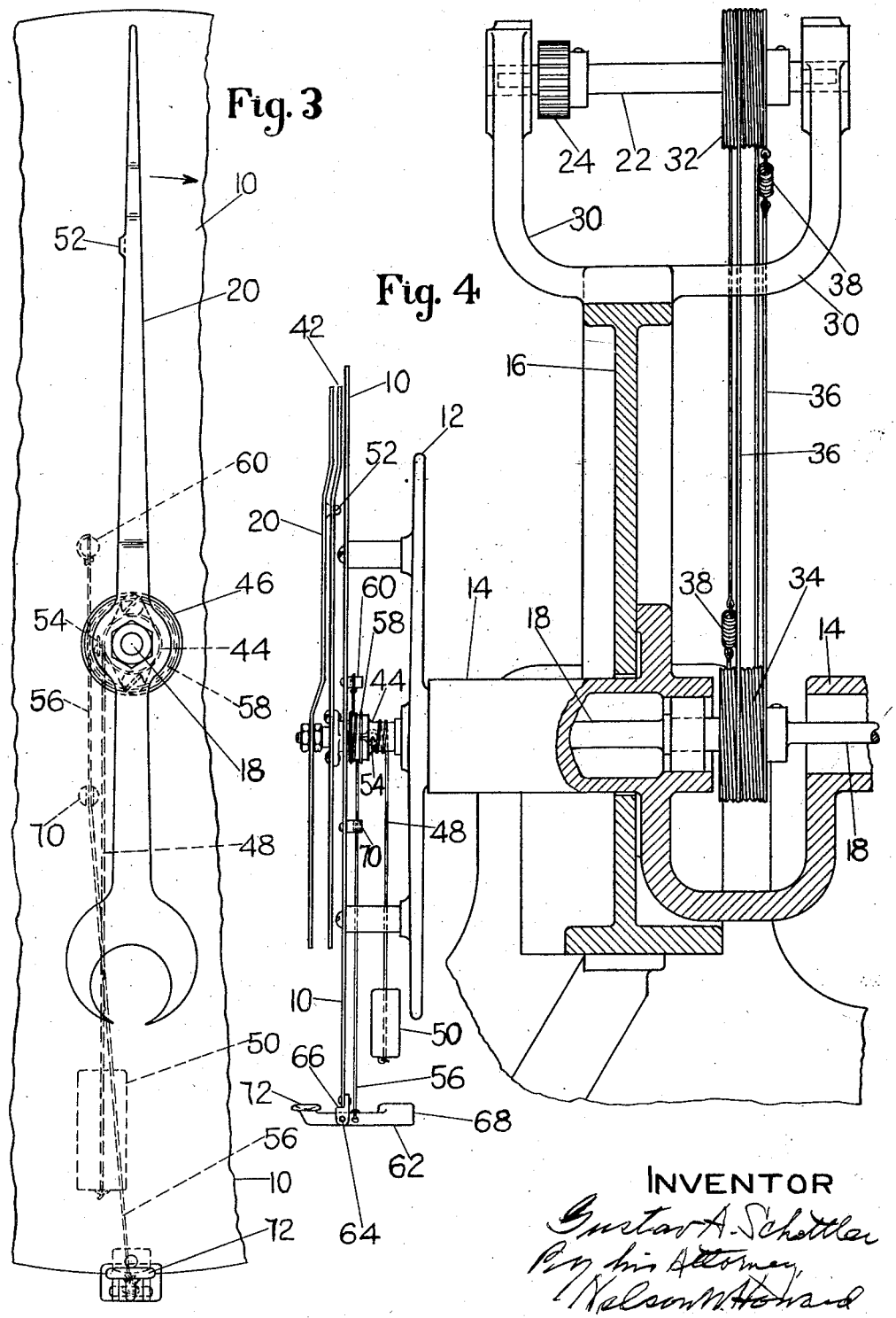
INVENTOR
Gustav A. Schettler Patented Oct. 22, 1929

1,732,341

UNITED STATES PATENT OFFICE

GUSTAV ADOLF SCHETTLER, OF BRAMLEY, LEEDS, ENGLAND, ASSIGNOR TO THE TURNER TANNING MACHINERY COMPANY, OF PORTLAND, MAINE, A CORPORATION OF MAINE

MEASURING MACHINE

Application filed September 7, 1926, Serial No. 133,979, and in Great Britain September 29, 1925.

This invention relates to measuring machines and is illustrated as embodied in a machine designed for measuring the surface area of hides and skins. It is to be understood, however, that the invention is not limited in its application to machines of the class illustrated but that the invention and various features thereof may have other applications and uses.

Area measuring machines of the type referred to are commonly provided with devices for indicating the measurement so that the operator may be informed of the result of the measuring operation. It is customary for the operator to call out the measurement to an assistant whose duty it is to mark the measurement on each piece of work as it comes from the machine. In the operation of indicator devices as heretofore constructed, no record of the measurement of a given piece of work remains after the indicating element has returned to its initial position preliminary to the operation of the machine in the measuring of a succeeding piece of work. Hence, if for any reason there was failure to mark upon the piece of work, or otherwise record, the measurement for that piece, the operator has had no recourse but to remeasure the work.

Accordingly, it is an object of the invention to provide a record of the measurement of a given piece of work which is available for a time after movement of the indicating element away from indicating position preparatory to the measurement of a succeeding piece of work, so that in case of dispute as to the measurement of the preceding piece of work, the record may be consulted, a check being in this way provided upon both the operator and his assistant.

To this end, and in accordance with an important feature of the invention, there is provided means controlled by the indicating element for continuing the record of the measurement after the indicating element has moved away from indicating position. In the illustrated machine there is associated with a dial and a pointer movable over the dial, an auxiliary pointer arranged to be operated by the main pointer and to be retained in indicating position while the main pointer returns to its initial position preparatory to the operation of the machine by a succeeding piece of work. Preferably, and as shown, the auxiliary pointer is operated in one direction by the main pointer and is held in its indicating position by means under the control of the operator so that the auxiliary pointer may be released subsequently to the return of the main pointer to initial position and before the completion of the measurement of a succeeding piece of work. In the illustrated embodiment of the invention, the auxiliary pointer is held in indicating position by means of a brake device, and is returned by initial position by means tending constantly to effect this return, and becoming operative upon release of the brake device by the operator.

Commonly the indicator means, comprising a dial and a pointer, employed in area measuring machines is located in an elevated, non-central position on the machine frame. Doubtless this position of the indicator was determined by the ease of connecting the indicator, when in the described position, with the totalizing mechanism of the measuring machine. Since the reading of the indicated measurement is taken by observation of the advanced position of the movable pointer with relation to its dial it follows that, if the dial and pointer are so located as to be at one side of the operator's working position, inaccurate reading of the indicated measurement is likely to result. The reason for this inaccuracy resides in the fact that the pointer is at a substantial distance from the face of the dial, so that when it is observed from an angle the relation of the pointer to the indications on the dial is apt to be determined inaccurately. Accordingly, it is a further object of the invention to provide an arrangement which will facilitate accurate reading of the indicator of an area measuring machine.

To this end, the indicator is located, in the illustrated improved construction, at a substantially central point above the measuring means, in front of the lower portion of the totalizing mechanism of the measuring elements, and thus directly in front of the operator as he stands in front of the machine in the best position to supply work to and remove it from the machine. Conveniently and as illustrated, the indicator device is operated by connecting means leading to the main totalizing element, without any change in the well-known construction and arrangement of the latter. In the illustrated construction, the shaft which carries the pointer of the indicator is connected by means of an endless wire band with a shaft operated by the totalizing mechanism—a shaft which formerly served as the pointer shaft of the indicator device. For the purpose of compensating for both expansion and contraction of the endless wire band, spring means is preferably provided in the length of the wire band operative to maintain a uniform tension whereby accurate movement of the pointer shaft is secured.

These and other features of the invention will be described in detail in the specification and pointed out in the appended claims.

In the drawings,

Fig. 3 is an enlarged view showing the brake means for the auxiliary pointer; and Fig. 4 shows driving connections, illustrated also in Fig. 2.

Figure 1:
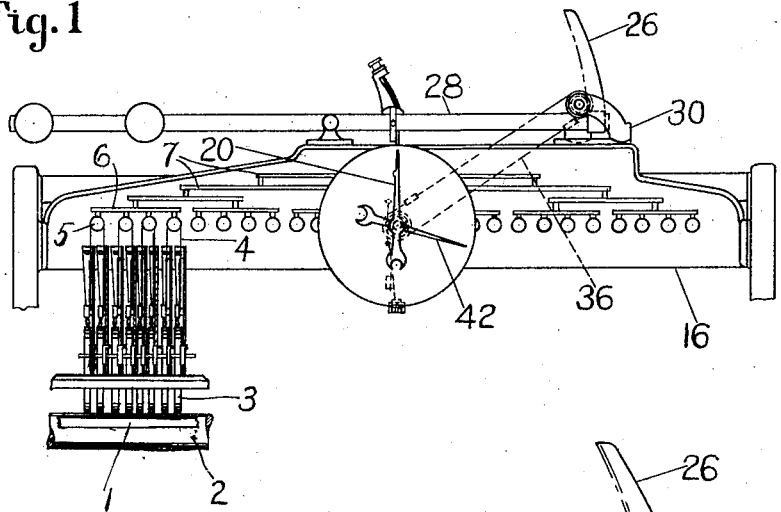
Fig. 1 is a view in front elevation of an area measuring machine illustrating a preferred embodiment of the invention.
Figure 2:
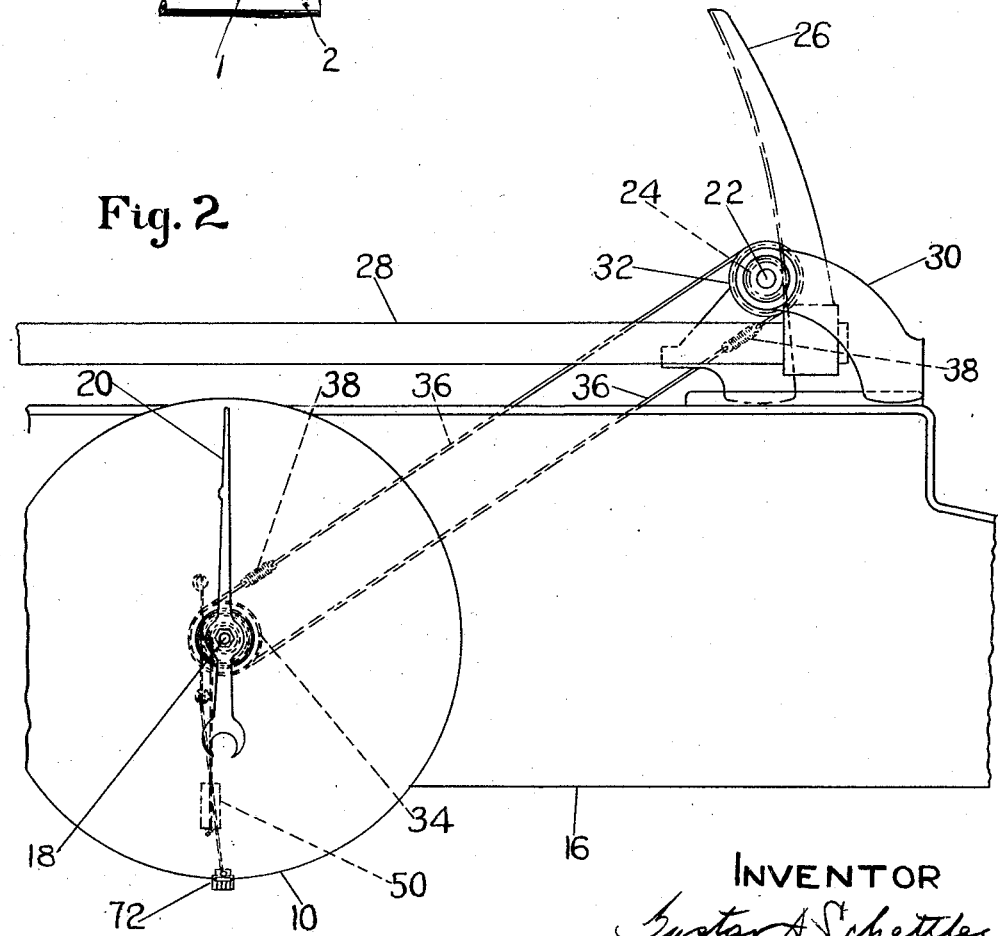
Fig. 2 is an enlarged detail view showing the driving connections for the pointers of the recording means.

In the drawings a measuring machine of a well-known type, designed for measuring hides and skins, is illustrated in part in Fig. 1, wherein reference character 1 indicates a table over which a piece of work to be measured is passed to a bed roll 2 and measuring rollers 3, the latter being movably supported to rest on the upper surface of the work to be rotated thereby as the work is fed through by reason of the rotation of the power-driven bed roll 2. Operatively connected to each pair of measuring rollers 3 is a chain 4 passing over an idler pulley 5 secured to a lever 6. Lever 6 and others of similar construction and arrangement are connected to lever 28 through a system of levers 7 by which movement of the measuring rollers 3 is totalized and caused to effect certain definite movements of the lever 28 in accordance with the areas of different pieces of work. For a more detailed description of the above mentioned parts of the illustrated area measuring machine, in the operation of which many linear measurements of the work are made in order to determine the area thereof, reference may be had to United States Letters Patent No. 931,144, granted August 17, 1909, upon application of L. O. Ramsdell.

For recording the measurement of a piece of work there is provided a dial 10 mounted on a holder 12 (Fig. 3) of usual form which is rigidly attached to a bearing 14 fixed in a central position on a beam or cross member 16 forming the upper part of the machine frame. Mounted within the bearing, upon ball bearings (not shown), is a spindle 18 to which a dial pointer 20 is attached. A pinion shaft 22 (Fig. 4), which is a shaft fitted with a pinion 24 for actuation during the measuring operation by a rack 26 and the lever 28, is carried by a bearing 30 in its usual position. This shaft is also mounted upon ball bearings (not shown). Pinned on the shaft 22 is a drum 32 having circumferential spiral V grooves therein and a similar drum 34 is pinned on spindle 18 of the dial pointer. Motion is transmitted from the one drum to the other by steel wires 36 there being preferably two of these. Each wire is passed one or more times around each drum and has its ends connected by a tension spring 38 which maintains the wire under sufficient tension to transmit rotation from one drum to the other. The two wires are so arranged that the connecting springs come on opposite sides of the drums. Thus one wire acts against the other to prevent backlash. Further by reason of the springs a compensating action is provided whereby expansion and contraction of the wires are automatically counteracted so that the wires are maintained under substantially uniform tension, thereby insuring positive and accurate transmission of the motion of the pinion shaft 24 to the spindle 18 of the dial pointer 20. The one or more turns of each wire about the drums prevent slip, and it is found that this form of intermediate connecting means constitutes an arrangement which is light, effective, and very suitable for the purpose. While it is preferred to use two wires, it is to be understood that, if desired, more than two or one only may be employed, such wires or wire having any convenient number of turns about the grooved drums. By the arrangement shown the dial 10 and pointer 20 may be located about centrally of the cross beam 16 while utilizing in part the regular and well-known operating connections between the pointer and the main lever of the totalizing mechanism commonly employed in measuring machines. By reason of this location of the dial and pointer the recorded measurement may be more easily and accurately read than in prior constructions, since the dial and pointer are directly in front of the operator and on a level with his eyes as he stands before his machine.

The dial 10 shown in the drawing is disposed at the front of the machine. In order that two dials may be employed, i. e., one at the front and the other at the rear of the machine, the bearing 14 and spindle 18 may be suitably extended as indicated at 40 in Fig. 4 for the attachment of an additional dial holder and pointer (not shown). Two dials are usually provided when two operators are employed on the same machine as for example when the machine is equipped with a stamping attachment.

Referring particularly to Fig. 4 of the drawings, an auxiliary pointer 42 shown disposed behind the main pointer 20, is attached to a sleeve or drum 44 adapted to rotate upon the main pointer spindle 18 at the back of the usual dial 10, i. e. between the latter and the dial holder 12. Since the auxiliary pointer 42 operates in front of the dial the latter has a hole 46 (Fig. 3) formed in it through which the front end of the drum projects. Suspended from the sleeve or drum 44 by means of a cord 48 attached to and wrapped round the sleeve or drum 44 is a weight 50 tending to hold the auxiliary pointer 42 in its normal or zero position in contact with a lug 52 projecting from the main pointer 20. The cord 48 may be anchored by means of a cotter pin 54 inserted in the sleeve or drum 44. The arrangement is such that, when the main pointer 20 is advanced in the direction of the arrow in Figure 3 to indicate a measurement, the auxiliary pointer 42 is advanced in company with it, by reason of the engagement of lug 52 on pointer 20 with the body of pointer 42, so that the sleeve or drum 44 is rotated and the weighted cord 48 is wound thereon. Combined with the sleeve or drum 44 is a brake which, in the construction shown, comprises a wire 56 wound one or more times round a grooved pulley 58 on the sleeve or drum 44 frictionally to engage and brake the drum. The wire is anchored at one end to the indicator dial by a pin 60 fixed therein, and at the opposite end to a counter-weighted lever 62 suitably disposed so as to be readily accessible to the operator. As shown said lever is fulcrumed on a pin 64 in a bifurcated member 66 attached to the lower part of the dial 10, the point of connection of the wire being between the fulcrum and a weight 68. A further object of winding the wire 56 round the grooved pulley 58 one or more times is to avoid side or end thrust on the parts. The wire 56 passes through a guide 70 fixed on the dial 10. Normally the brake wire 56 grips the sleeve or drum pulley 58 with sufficient firmness to prevent rotation thereof under the action of the weight 50, but not sufficiently to prevent the operation of the auxiliary pointer by the main pointer or detrimentally to affect the action of the latter. Thus when the auxiliary pointer 42 is advanced as aforesaid it remains at the farthest point of advancement when the main pointer is returned to the zero position and until the operator actuates the lever 62 the auxiliary pointer continues to indicate the measurement (see Fig. 1) in accordance with the action of the measuring devices on the material passed through the machine. In this way the auxiliary pointer serves as a check upon both the operator and his assistant and may be used to keep a record of a measuring operation on one piece of work until after a new piece of work has been introduced into the machine. When ready the operator, may, by depressing the end 72 of the lever 62 against the action of the weight 68, relieve the tension on the brake wire 56 thus releasing the drum 44 to the action of the weighted cord 48, whereupon the auxiliary pointer 42 is returned to the zero position by means of the cord 48 and the weight 50 associated with it.

Having described my invention, what I claim as new and desire to secure by Letters Patent is:

1. In a measuring machine, means for measuring a dimension of pieces of work, means comprising a member movable into position to indicate a measurement of said dimension in successive pieces of work, and means controlled by said member and operative to indicate visually said measurement of each successive piece of work after movement of said member from said measurement indicating position.

2. In a measuring machine, means for measuring a dimension of pieces of work, an indicator for indicating the measurement of successive pieces of work, said indicator comprising a member returnable to initial position following each measuring operation, and means operable by said member to a position to indicate visually the measurement of each successive piece of work after the return of the member to initial position.

3. In a measuring machine, means for measuring a dimension of pieces of work, an indicator for indicating the measurement of successive pieces of work comprising a member movable to indicate the measurement and returnable to initial position at the end of the measuring operation, and a second member operable by the first member to a position to indicate the measurement of each successive piece of work after the first member has returned to initial position.

4. In a measuring machine, means for measuring a dimension of a piece of work, an indicator for indicating the measurement at the end of the measuring operation, said indicator comprising a dial and a pointer movable over the dial, and an auxiliary pointer controlled by the first-mentioned pointer and operative to indicate the measurement of a piece of work and constructed and arranged to continue in indicating position after the removal of the piece of work and the return of the first pointer to initial position.

5. In a measuring machine, means for measuring a dimension of pieces of work, means comprising a member movable into position to indicate a measurement of said dimension in successive pieces of work, and an auxiliary member movable in one direction by the first mentioned member and operative to indicate visually the measurement of said dimension in each successive piece of work and constructed and arranged to remain in indicating position after removal of a measured piece of work and movement of the first member away from indicating position.

6. In a measuring machine, means for measuring a dimension of pieces of work, means comprising a member movable into position to indicate a measurement of said dimension in successive pieces of work, and means operative to indicate visually said measurement of each successive piece of work after movement of member from said measurement indicating position, said means being releasable by the operator to move away from indicating position.

7. In a measuring machine means for measuring a dimension of pieces of work, an indicator for indicating the measurement in successive pieces of work, said indicator comprising a member returnable to initial position following each measuring operation, means for visually indicating the measurement of each successive piece of work after the return of the member to initial position, and means under control of the operator for releasing the indicating means for movement away from indicating position.

8. In a measuring machine, means for measuring a dimension of pieces of work, means comprising a member movable into position to indicate a measurement of said dimension, in successive pieces of work, additional means movable by said member to a position to indicate visually said measurement of each successive piece of work, and means under the control of the operator for retaining the last-named means in measurement indicating position after movement of said member from said measurement indicating position.

9. In an area measuring machine, means for measuring a dimension of pieces of work, means comprising a member movable into position to indicate a measurement of said dimension in successive pieces of work, and auxiliary means movable with the member to indicate visually said measurement of each successive piece of work after movement of said member from said measurement indicating position.

10. In an area measuring machine, means for measuring a dimension of a piece of work, an indicator for indicating the measurement comprising a dial and a pointer movable over the dial, and an auxiliary pointer, arranged to be moved by the first-mentioned pointer to indicate the measurement on the dial, said auxiliary pointer being constructed and arranged to remain in indicating position during movement of the first-mentioned pointer away from indicating position.

11. In a measuring machine, means for measuring a dimension of a piece of work, an indicator for indicating the measurement at the end of the measuring operation, said indicator comprising a dial and a pointer movable over the dial, and an auxiliary pointer also operative to indicate the measurement and constructed and arranged to continue in indicating position during the return of the first pointer to initial position, and power means under the control of the operator for returning the auxiliary pointer to its initial position.

12. In a measuring machine, means for measuring a dimension of a piece of work, an indicator for indicating the measurement comprising a dial and a pointer movable over the dial, and an auxiliary pointer arranged to be moved by the first-mentioned pointer to indicate the measurement on the dial, and means for retaining the auxiliary pointer in indicating position after the first pointer has moved away from indicating position.

13. In a measuring machine, means for measuring a dimension of a piece of work, an indicator for indicating the measurement comprising a dial and a pointer movable over the dial, and an auxiliary pointer also movable to indicate the measurement on the dial, and means under the control of the operator for retaining the auxiliary pointer in indicating position after the first pointer has moved away from indicating position.

14. In a measuring machine, means for measuring a dimension of a piece of work, an indicator for indicating the measurement comprising a dial and a pointer movable over the dial from an initial position to measurement indicating position, an auxiliary pointer also movable to indicate the measurement on the dial, said pointers being movable together in one direction and independently of each other in another direction, and a brake for retaining the auxiliary pointer in indicating position after the removal of the piece of work being measured and the return of the first pointer to its initial position.

15. In a machine for measuring the surface area of hides and skins and other like pieces of work, means for measuring a dimension of a piece of work, an indicator for indicating the measurement comprising a dial and a pointer movable over the dial, an auxiliary pointer also movable to indicate the measurement on the dial, a brake for retaining the auxiliary pointer in indicating position when the first pointer is returned to initial position, and means for releasing the brake to permit the auxilary pointer to return to its initial position.

16. In an area measuring machine, means for measuring a dimension of a piece of work, an indicator for indicating the measurement comprising a dial and a pointer movable over the dial, an auxiliary pointer also movable to indicate the measurement on the dial, a brake for retaining the auxiliary pointer in indicating position when the first pointer is returned to initial position, and manually operable means for releasing the brake to permit the auxiliary pointer to return to its initial position.

17. In a machine for measuring hides and skins and other like pieces of work, means for measuring a dimension of a piece of work, an indicator for recording the measurement comprising a dial and a pointer movable over the dial, an auxiliary pointer operable to indicate the measurement after movement of the first pointer away from indicating position, means constantly tending to return the auxiliary pointer to initial position, means for holding the auxiliary pointer in indicating position, and means for releasing said last-named means to permit return of the auxiliary pointer to its initial position.

18. In an area measuring machine, means for measuring a dimension of a piece of work, an indicator for recording the measurement comprising a dial and a pointer movable over the dial, an auxiliary pointer operable by the first pointer and designed to indicate the measurement after the first pointer has returned to initial position, spring means constantly tending to return the auxiliary pointer to initial position, a brake for holding the auxiliary pointer in indicating position, and means under the control of the operator for releasing the brake to permit return of the auxiliary pointer to its initial position.

19. In a measuring machine, means for measuring a dimension of a piece of work, an indicator for indicating the measurement comprising a dial and a pointer movable over the dial, an auxiliary pointer also movable over the dial for indicating the same measurement, means tending constantly to return the auxiliary pointer to its initial position, a brake for holding the auxiliary pointer in indicating position during and after the return of the first pointer to its initial position, said brake comprising a drum secured to the auxiliary pointer, a wire wound around the drum frictionally to engage the latter with pressure sufficient to hold the pointer in indicating position, and a manually operable lever for loosening the wire on the drum whereby the auxiliary pointer is allowed to return to its initial position.

20. In an area measuring machine, means for measuring the area of sheet material, an indicator for indicating the measurement, a totalizing mechanism between the measuring means and the indicator, a shaft arranged to be operated by the totalizing mechanism, a second shaft constituting a part of the indicator, said indicator comprising also a pointer mounted on the last-mentioned shaft, and driving means for connecting the two shafts.

21. In a measuring machine, means for measuring the area of pieces of leather comprising a plurality of measuring elements located in a row for contacting with a piece of leather in a line extending transversely thereof, totalizing mechanism, and an indicator for indicating the totalized measurement, said indicator being located in front of the lower portion of the totalizing mechanism and above and substantially in line with the centrally disposed element of the row of measuring elements.

22. In an area measuring machine, means for measuring the area of pieces of leather comprising a row of measuring elements extending along a line crosswise of the machine, means comprising a lever for totalizing the measuring movements of the measuring elements, an indicator for indicating the measurement as determined by the totalizing mechanism, said indicator comprising a dial, a shaft, a pointer mounted on the shaft, and operating connections comprising an endless belt between the shaft and the said lever for transmitting the motion of the lever to the pointer of the indicator.

23. In a measuring machine, means for measuring a dimension of a piece of work, a dial, a pointer movable over the dial for indicating the measurement, a shaft for supporting the pointer, a drum connected to the shaft, a second shaft arranged to be operated from any suitable source of power, a drum on the second shaft, and a wire driving device passing over the drums for transmitting movement from the second to the first-mentioned shaft, said device comprising compensating means whereby expansion and contraction of the wire is automatically counteracted so that the wire remains under substantially uniform tension.

24. In a measuring machine, means for measuring a dimension of a piece of work, a dial, a pointer movable over the dial for indicating the measurement, a shaft for supporting the pointer, a drum connected to the shaft, a second shaft arranged to be operated from any suitable source of power, a drum on the second shaft, an endless wire band passing around the drums for driving the shaft in the indicator from the other shaft, and spring means interposed in the length of the wire band to maintain substantially uniform tension in the wire band thereby insuring accurate and uniform transmission of the motion from one shaft to the other.

25. In a measuring machine, means for measuring a dimension of a piece of work, a dial, a pointer movable over the dial for indicating the measurement, a shaft for supporting the pointer, a drum connected to the shaft, a second shaft arranged to be operated from any suitable source of power, a drum on the second shaft, a plurality of endless wire bands passing around the drums for driving the shaft in the indicator from the other shaft, and spring means interposed in the length of each wire band to maintain substantially uniform tension in the associated wire band, said spring means being arranged on opposite sides of the two drums, thereby insuring accurate and uniform transmission of the motion from one shaft to the other.

In testimony whereof I have signed my name to this specification.

GUSTAV ADOLF SCHETTLER.